United States Patent Office 3,528,821
Patented Sept. 15, 1970

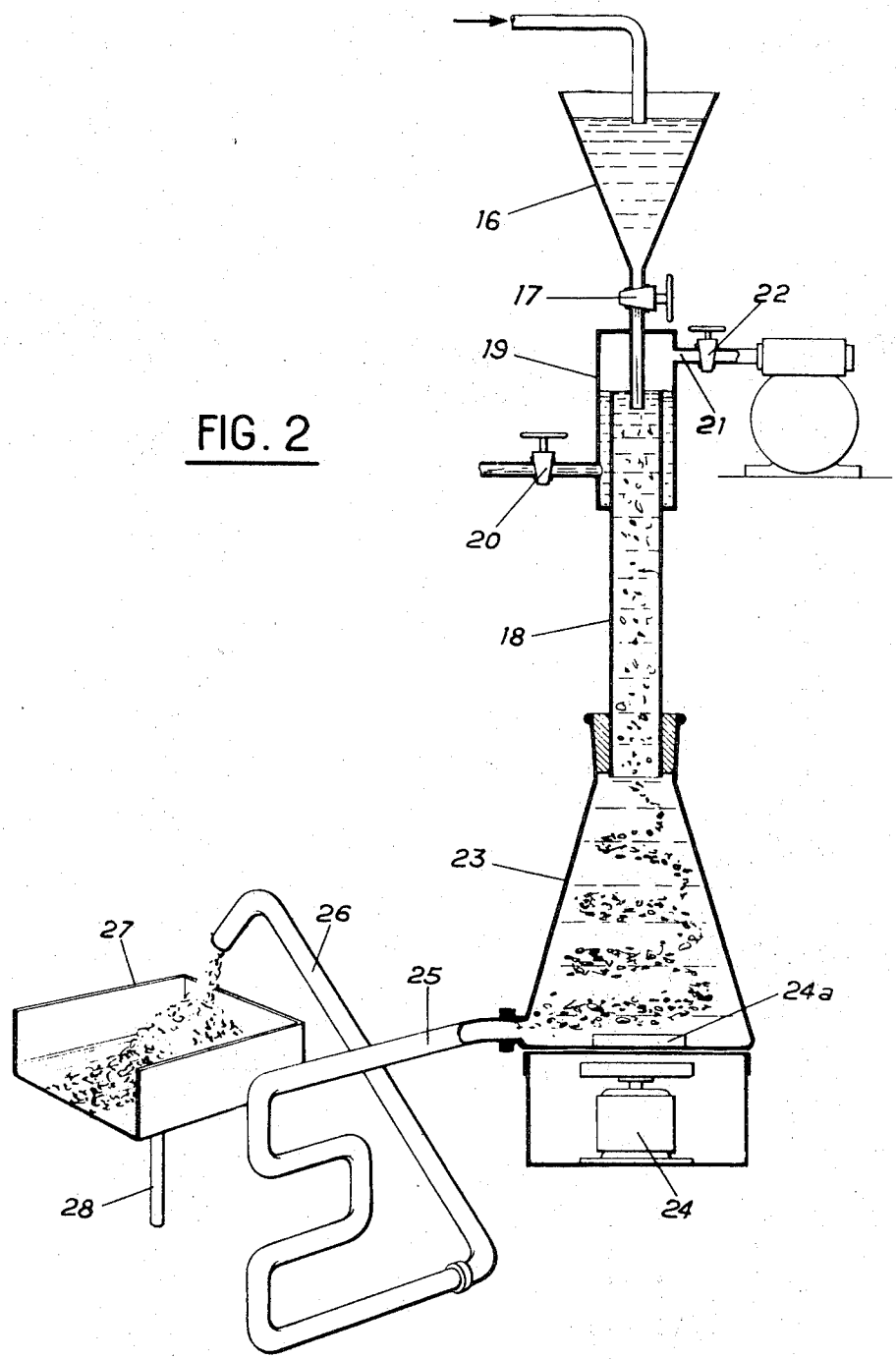

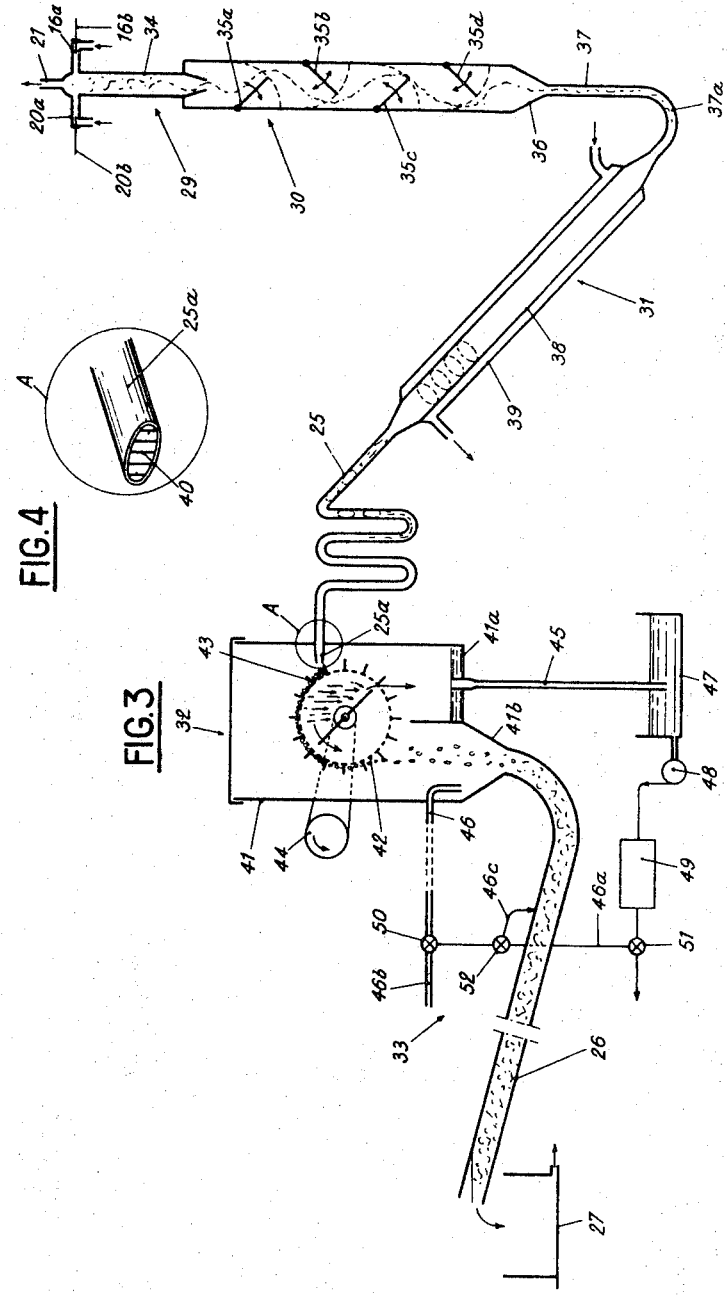

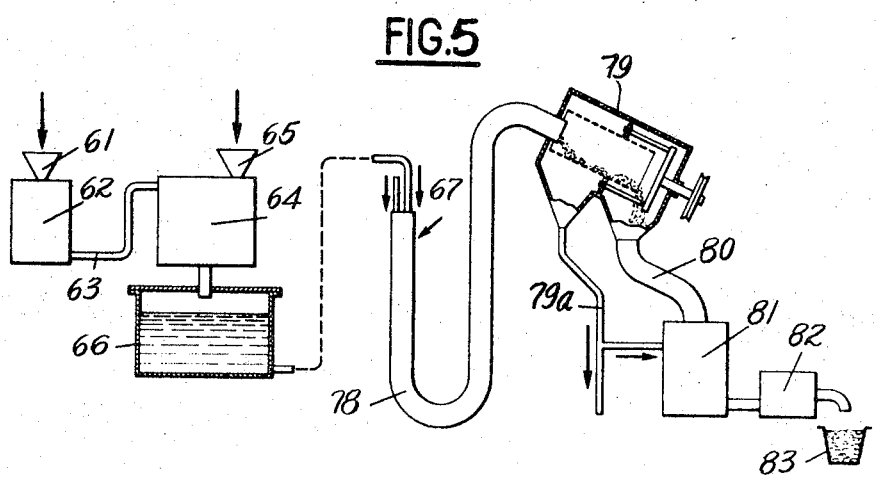
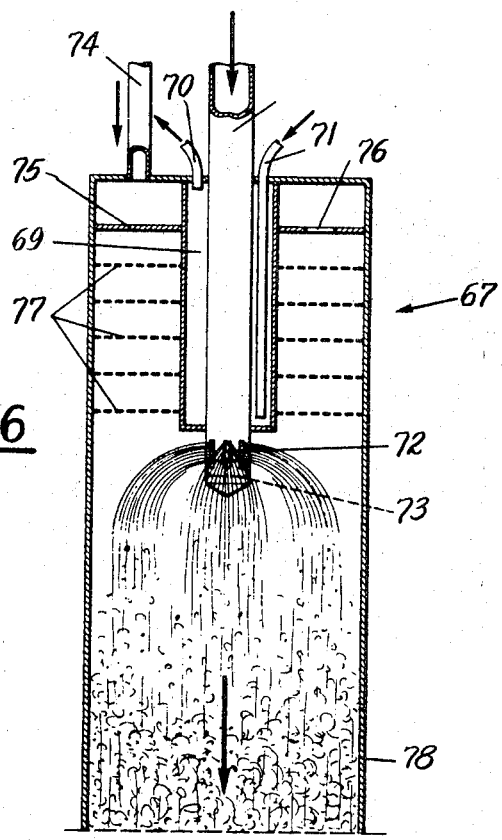

3,528,821
CONTINUOUS CHEESE-MAKING PROCESS
Pierre Stenne, Vitry-le-Francois, France, assignor to Paracurd S.A., Geneva, Switzerland
Continuation-in-part of applications Ser. No. 549,669, May 12, 1966, and Ser. No. 833,831, Mar. 28, 1969, which are the continuation of application Ser. No. 439,829, Mar. 15, 1965. This application June 27, 1969, Ser. No. 837,089
Claims priority, application France, May 12, 1965, 1,458,172
Int. Cl. A23c 19/02
U.S. Cl. 99—116                              17 Claims

ABSTRACT OF THE DISCLOSURE

A process for making cheese from milk which comprises the steps of concentrating whole milk, inoculating said milk with a lactic ferment, adding rennet to said concentrated inoculated milk while maintaining said milk too cold to coagulate, heating said milk by dilution with hot water after a time delay of at least several minutes, to a temperature which produces rapid coagulation but is insufficient to substantially inactivate the lactic ferment, removing the whey, and forming the remainder into cheese in a conventional manner.

SUMMARY OF THE INVENTION

This application is a continuation-in-part of my copending application S.N. 833,831, filed Mar. 28, 1969, which was itself a continuation of a prior application, Ser. No. 439,829, filed Mar. 15, 1965, and both now abandoned.

It is also a continuation-in-part of my prior copending application, S.N. 549,669, filed May 12, 1966, and relates to the process for which the apparatus described in my copending application filed June 27, 1969 (which was also a continuation-in-part of both S.N. 439,829 and S.N. 549,669), was designed.

Conventional processes of making cheese comprise several steps the principal ones of which are: preparation of the milk to be treated, coagulation, draining the curds, and curing the cheese.

It is customary, when preparing the milk, to first filter, and then pasteurize it, after which it may be subjected to a standardizing process to bring its percentage of fatty components to a value dependent on the percentage of such components to be included in the finished cheese.

The composition of the milk varies considerably with its source and with the time of year, and it is therefore necessary, in order to obtain uniform results in the manufacture of cheese, to prepare mixtures containing large quantities of milk.

In order to insure a more uniform quality in the end product it has been suggested that the milk be concentrated to a fixed percentage of solids (three times the percentage of solids in the original milk, for example) and then diluted by adding water until the percentage of solids is brought back up to the average content of the original milk. This known process also has the advantage that it is more convenient to store the milk in its concentrated form and that the quantity of cheese obtained is increased, since the concentrating step causes a modification in the phosphocaseinate particles of the cheese, hereinafter discussed in greater detail, and this modification is not completely counteracted by the redilution step.

Prior processes for making cheese also comprise coagulating and draining steps which take considerable time, so as to be expensive in terms of labor cost and keep productive capacity rather low.

Moreover, current techniques in actual use do not insure that the cheese produced will be constant in weight. This results in a substantial loss to the manufacturer, since for cheeses sold in the piece, he must increase the weight of a group of cheeses in order to make sure that each individual cheese is of the required minimum weight.

The object of the present invention is to reduce the time required to form and drain the curds and to exploit this time saving to set up a continuous manufacturing process which takes only a relatively short time.

Attempts have already been made to reduce the time of coagulation of the milk by applying preliminary rennet to the normal cold milk. In addition to the fact that this process has no effect on the weight uniformity of the resulting cheeses, it causes a much smaller increase in the speed of curd forming and draining than the one resulting from the process according to the present invention and has not improved the efficiency of manufacture.

Attempts have also been made to speed up the coagulation of milk treated with rennet at cold temperature, using a heating fluid having a temperature between 50 and 100° C., but in this case there is a substantial inactivation of the lactic ferments with which the milk has been treated and this results in cheeses of very mediocre quality.

The object of the present invention is to provide a process for making cheeses or casein which is continuous, and starts with milk from cows, goats, sheep or buffalo. This process is essentially characterized by the fact that normal milk is subjected to evaporation, preferably by concentrating it in a film evaporator, and inoculated with lactic ferments; rennet is then added to cold milk; the mixture is then heated by means of hot water after remaining in contact with the rennet for a certain time, which depends on the type of cheese desired, so as to produce rapid coagulation; after which the curds are drained more or less rapidly and the resulting paste may be washed, salted and cured.

It is an important characteristic of the invention that the step of concentrating the milk and causing the lactic ferment and rennet to act on the concentrated milk has a great influence on the process of coagulation and draining.

The concentration of the milk has caused in particular an increase in the concentration of $Ca^{++}$ and $H^+$ ions and it is well known that an increase in the concentration of these ions is an accelerating factor for coagulating speed. On the other hand, the phosphocaseinate particle undergoes, as has already been pointed out, a modification in shape and size during the concentration step. This particle is much larger in the concentrated milk than in normal milk, and is less regular in shape. It follows the curds formed during the coagulation of concentrated milk are by no means the same as those formed from normal milk. In the case of concentrated milk, curds are obtained which are much more firm and when the curds are finally drained much less material useful in making cheese is drained off with the whey than in the processes heretofore known. This is particularly true of the fatty constituents. It follows that there is an increase in the quantity of cheese produced from a given quantity of milk.

From the foregoing the entire difference between the process according to the invention and the processes previously used will be readily understood. In the process which uses preconcentration, followed by redilution, before inoculation and treatment with rennet, to a percentage of solids approximating that in the normal milk with which the process started, the redilution prevents full exploitation of the increase in the size of the phosphocaseinate particles, since these particles return gradually to their original shape and size. In this process, since the lactic ferments and rennet are added to the rediluted milk, the advantage of an increased speed of coagulation due to operation in a concentrated medium is lost.

In known processes in which rennet is introduced into normal cold unconcentrated milk, there is no increase in the speed of coagulation such as results when there is a high concentration in $Ca^{++}$ and $H^+$ ions, and there is no increase in the yield due to the modifications of the phosphocaseinate particles which results from concentration of the milk. In the processes using a preliminary addition of cold rennet, the coagulation and draining take place under conditions entirely different from those obtaining during the process according to the present invention.

In one preferred method of carrying out the invention, the process consists in first concentrating normal milk, which may have been filtered, standardized, homogenized and pasturized, until the percentage of solids is from two to four times that prevailing in normal milk. This concentration is effectuated in an evaporator of a conventional type, preferably a film evaporator, which operates under sub-atmospheric pressure, using a thin sheet of liquid and a temperature below that at which the proteins in the milk would denature (about 65° C.).

After the concentrating step, the concentrated milk is immediately cooled in a heat exchanger to a temperature less than about 10–12° C. The concentrated milk is then stored at this temperature in insulated vats having double walls, and about 2% of lactic ferments is introduced to create lactic flora for the protection of the mixture. After having been stored for several hours, the temperature of the concentrated milk is increased to about 30° C., and a supplemental dose of about 5% of the same lactic ferments is added to the milk. At this temperature the presence of the lactic ferments brings about a progressive transformation of the lactose of the milk into lactic acid. The pH of the mixture then becomes acid, and when this pH reaches a value between about 4.6 and 6.5 the concentrated milk is cooled to a temperature below about 10° C.

The desired pH may in certain cases be obtained directly, or may be adjusted in the process just described, by adding to the milk a quantity of lactic ferments such that the desired pH is obtained immediately.

A quantity of rennet corresponding to that normally used in conventional processes for obtaining the type of cheese in question is then added to the concentrated and acidified cold milk. The dose of rennet added to the concentrated milk is the same in absolute value as would have been added to the normal milk. Dependent upon the time of contact between the concentrated milk and the rennet, the enzymatic action of the rennet will have a greater or smaller effect, and after the concentrated milk which has been so treated has been rapidly reheated by addition of hot water, an instantaneous or controlled rapid coagulation is obtained.

This coagulating step is followed by a draining step the length and nature of which depends on the type of cheese being made.

In particular, when soft cheeses are to be made, the cold concentrated milk is kept in contact with the rennet for from about 5 to about 12 minutes. It is then heated rapidly by mixing it with hot water and coagulation results in a short time, between about 40 and about 120 seconds, the mixture being kept still at the moment of coagulation.

The dilution effectuated during this reheating step lasts for such a short time before the collection or pressing of the curd that the phosphocaseinate particles do not have time enough to return to the state in which they existed in the normal starting milk, and consequently all the advantages resulting from use of the concentrated mixture are retained.

When the curd has attained a certain firmness it is sliced to permit a suitable syneresis. This is followed by spontaneous slow draining, and the curd is then separated into conventional cheese molds.

When making a semi-soft cheese, the cold concentrated milk is left in contact with the rennet for a little longer than in the previous case, from about 30 to about 60 minutes, for example. The concentrated acidified cold milk is then reheated by introducing it into a stream of non-turbulent hot water. The concentrated milk coagulates almost instantaneously without any dilution. The curd grains are then washed and agglomerated by mechanical means, thus accelerating the drainage.

When making a cured or hard cheese, of the Cheddar type, for example, the cold concentrated milk, acidified to a suitable pH, is kept in contact with the rennet for about 30 to 60 minutes. It is then reheated by being introduced into a non-turbulent stream of hot water, at an appropriate temperature, the rate of flow of which is from 1 to 3 times that of the concentrated milk, depending upon the type of cheese to be made. Coagulation is then immediate. The grains of the curd are mechanically agglomerated and the grain is separated from the whey. The whey, after heating in a heat exchanger to an appropriate temperature, is reintroduced into the curd, so as to produce a curing of the curd, and in the case of Cheddar, an appropriate "Cheddarization."

While the milk is being ripened by the lactic ferments, the required heating and cooling steps to which it must be subjected may be carried out by circulating the concentrated milk in a suitable heat exchanger, heated by hot water or steam, or cooled by a refrigerating fluid. These different operative steps may be programmed or controlled automatically and the ferments may be added manually or by automatic dosing means, with the operator controlling the acidity and temperature of the concentrated milk. In like manner, the rennet may be added manually or automatically, either by leading the acidified concentrated cold milk through batteries of vats having gauged volumes, in which the rennet is added to and mixed with the concentrated milk, and in which the concentrated curdled milk remains for a predetermined time, or by continuously injecting the rennet into a tube through which the concentrated milk is pumped. This tube is so dimensioned that the milk remains in it for a period of time, say 5 to 60 minutes, dependent on the type of cheese being made.

A further object of the present invention is to provide means for carrying out the foregoing process, i.e., means for coagulating a concentrated, acidified cold milk, to which rennet has been added, by rapidly adding hot water, then separating the curds from the whey, and finally washing the grains of curd either with hot or cold water, or with whey, or with a mixture of water and whey, which may be hot, or chilled, or at room temperature, and finally collecting the curd for subsequent molding in conventional cheese molds.

In order that the invention may be clearly understood, certain devices for carrying out the aforesaid process will now be described, with reference to the accompanying drawings. Five examples of methods for producing five different kinds of cheese, utilizing the process according to the invention, will also be given.

On the drawings:

FIG. 2 shows apparatus for manufacturing a pressed or "hard" cheese, which can be operated continuously and automatically;

FIG. 3 is a schematic view showing an alternative embodiment of the apparatus of FIG. 2;

FIG. 4 is a detail view showing on an enlarged scale the encircled portion of FIG. 3 indicated by the letter A;

Figure 1:
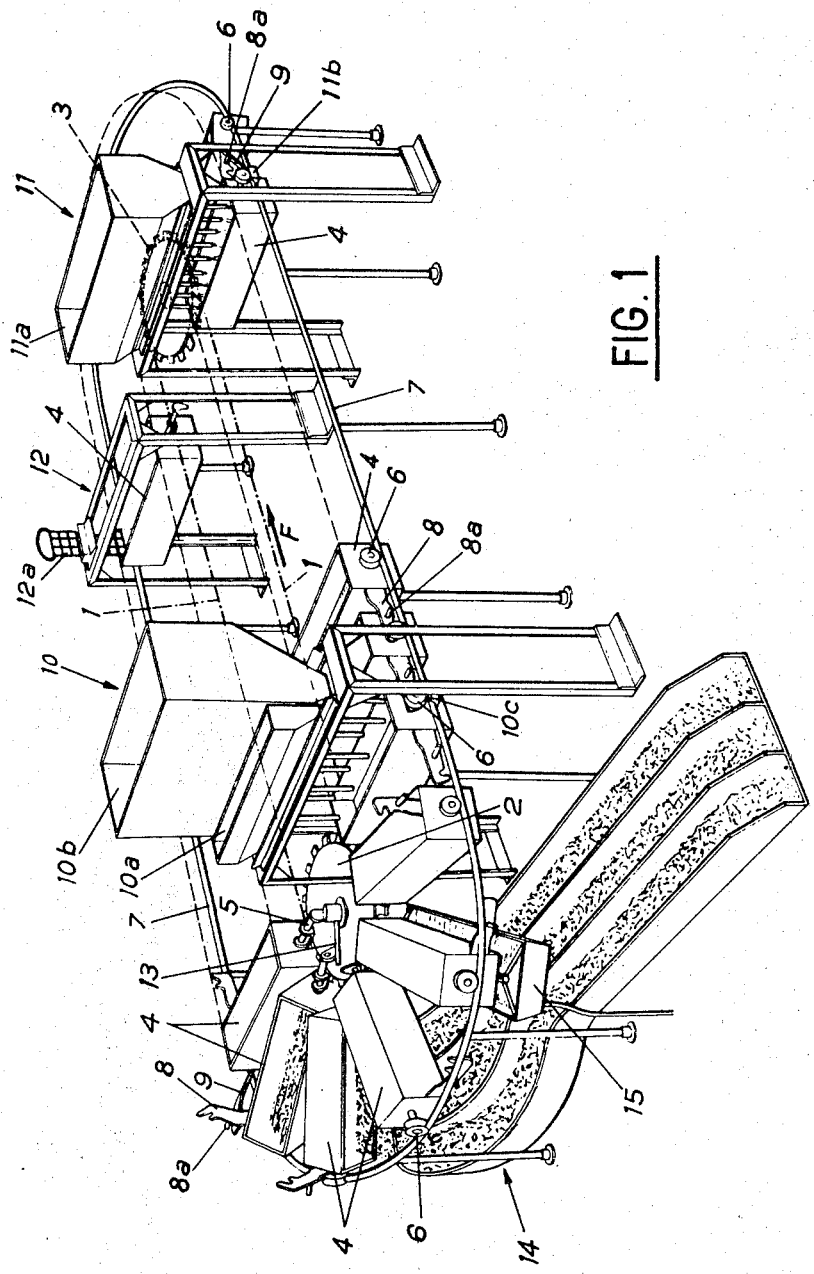
FIG. 1 is a schematic perspective view showing an installation for manufacturing either soft or pressed cheese, which installation can be operated continuously and automatically.

FIG. 5 schematically illustrates the different stages of a related process in which rennet is not required; and FIG. 6 is an axial sectional view through an injection head which is particularly useful in the process of FIG. 5, but may also be used in other processes of the general type hereinbefore described.

On FIG. 1, reference numeral 1 indicates an endless chain which travels over two sprocket wheels 2 and 3, wheel 3 being driven. Tanks 4, which are rectangular in section, are attached to this chain by means of shafts 5. Each tank is supported at its opposite end by a roller 6 which rolls on a track 7. The tanks travel in the direction indicated by the arrow F, FIG. 1. In the straight sections of their path of travel the tanks are connected to each other by catches 8 which bear on the axes of the rollers 6. The tanks are disconnected when they arrive at the curved portions of this path of travel, by ramps 9, which lift the bins 8a carried by the catches 8. Gantries 10, 11 and 12 are positioned above the straight portions of the path of travel.

The gantry 10 comprises a device 10a–10b which can empty into a tank 4, when it passes beneath the gantry 10, a measured quantity of rennet from the tank 10a, and then a quantity of concentrated cold milk from the tank 10b. The gantry 11 comprises a device 11a from which the tanks 4 may be uniformly dosed with hot water. The gantry 12 is provided with cutting grilles 12a.

In the curved portion following the gantry 12, a bar 13 fixed to the framework of the machine swings the tanks 4 around the axis 5. This tilting takes place over a distributor 14. Between the position at which the bar 13 tilts the tanks 4, and the gantry 10, is a tank washing device 15 schematically shown on FIG. 1.

In the above described apparatus, when one of the tanks 4 passes under the gantry 10, the switch 10c causes the introduction into this tank of a predetermined quantity of rennet, which is well distributed through the tank, followed by a predetermined quantity of concentrated cold milk which has been inoculated with lactic ferments. The chain 1, is driven by the sprocket wheel 3, which is driven by an electric motor provided with speed control means, which motor insures movement of the tank 4 along the track at a constant, but adjustable, speed in the direction indicated by the arrow F. The quantity of concentrated milk and rennet introduced into the tank 4 is controlled by a mechanism capable of measuring within an error of 0.1% the quantities of liquid dispensed into each tank. The inlet pipes are so positioned as to insure thorough mixing of the concentrated milk and rennet in each tank 4.

The tanks 4, filled with concentrated milk which has been dosed with rennet and is maintained at a temperature of about 10° C, moves from beneath the gantry 10 to beneath the gantry 11. The distance between these two gantries determines the length of time that the cold concentrated milk remains in contact with rennet. This length of time may also be regulated by controlling the speed at which the chain 1 moves. When the tank 4 comes to a position beneath the gantry 11, a switch 11b is thrown and causes the delivery into the tank of a quantity of hot water. The device 11a insures that this water is well distributed throughout the tank. This water is kept at a constant temperature (about 50° C., for example) by suitable automatic temperature regulating means. The quantity of water introduced, and its temperature, are so regulated that the temperature of the resulting mixture will be of the order of 30° C.–35° C. and that the percentage of solids in the mixture will be about 1.1 times the percentage of solids in the original milk, before it was concentrated. The quantities of concentrated milk and hot water in each tank are so measured out as to yield, after curdling and draining, one or more cheeses of equal weght.

After introduction of the hot water, the tank 4 continues to move along the track. The time required for coagulation, at a given temperature, is essentially a function of the time during which the cold milk was in contact with the rennet before the hot water was added.

If the time of cold contact with the rennet is small, the time required for coagulation is relatively long and the gantry 12 must be spaced a relatively long distance from the gantry 11, so that between the gantries 11 and 12 the mixture in the tanks 4 will have time to form sufficiently firm curds.

When the tank passes under the gantry 12, the cutting grilles 12a move through the tank 4. The curd, which forms in from 40 to 120 seconds, depending on the acidity of the original concentrated milk, the temperature, the time of cold contact with the rennet, and the quantity of rennet, is thus cut into small cubes. At this point syneresis begins (the phase during which the whey separates from the grains of curd.

If, on the contrary, the rennet was in contact with cold milk for a relatively long time, say 30 minutes or so, coagulation is instantaneous upon the introduction of hot water. The hot water then washes the grains of curd as well as causing their coagulation. In this case the cutting grilles of the gantry 12 are not actuated when the tank 4 passes under the gantry 12.

When the tanks 4 reach the curved part of the track which follows the gantry 12, they are automatically emptied by tipping them above the distributor 14, which divides the curd up evently before it enters the molds. The tanks 4 are then washed and dried by the device 15 and return to their original position under the gantry 10.

It will be appreciated that this machine may be of a reasonable size, in view of the short curd forming and draining times required by the process according to the present invention, whereas a continuously operating machine using the previously known processes would have to be extremely large and costly.

FIG. 2 shows another type of apparatus which may be used to carry out the process constituting the present invention. In this apparatus, it will be seen that the concentrated, acidified, cold milk which has been treated with rennet is introduced into a funnel 16. The level of liquid in this funnel is kept constant by known means. The funnel 16 is provided with a valve 17 at its lower end and opens into a vertical tube 18, the upper part of which is encircled by a jacket 19. Hot water is supplied to this jacket through an inlet pipe 20. At the top of the tube 18 and the jacket 19 is suction means 21 provided with a control valve 22. The tube 18 is positioned above a container 23 in which there is a magnetic agitator 24, 24a. An elbowed tube 25 is connected to an inclined tube 26, which terminates over a container 27 having an outlet in its bottom.

In order to make a pressed cheese, the concentrated milk which is cold and has been dosed with rennet, is led to the upper part of the apparatus and subjected to cold for an adequate length of time, of the order of thirty minutes, for example. It is at a temperature of about 10° C. Water at about 45° C. is introduced into the apparatus through the inlet tube 20. The pH of this water may be suitably adjusted and a slight vacuum is created by the suction means 21 so that once the apparatus has been filled with hot water, a column of water is maintained in the tube 18. The upper level of the column of water may be regulated according to the extent to which the concentrated milk is to be heated before coming into direct contact with the water. The jacket 19 makes it possible to provide a non-turbulent flow of hot water in the tube 18. When the valve 17 is opened, the cold, concentrated, rennet containing milk is sucked into the apparatus and falls into the column of hot water. The milk coagulates almost instantaneously and the grains of curd fall by gravity down through the column of water in the vertical tube 18. These grains reach the container 23 where they are stirred by the agitator 24a so that the grains of curd are washed in the liquid in the container.

Carried by the flow of hot water which comes in through the tube 20 and leaves through the tube 26, the grains of curd travel along the tube 25. Since this tube is provided with elbows, the curd grains tend to settle and accumulate at these elbows. The curd grains are thus so mechanically agglomerated that small gobs of paste fall from the outlet end of the tube 26 into the tank 27, where they continue to drain, with the whey flowing out through the pipe 28. The paste left in the tank 27 may be removed by any appropriate means and transferred to conventional cheese molds.

In this apparatus, the agglomerating tube 26–26 may comprise either such elbows as shown on FIG. 2, or constrictions on baffles, or the tube itself may be of decreasing cross-section.

The grains may also be agglomerated by means of a centrifuge, which ensures the continuous separation of curd and whey, or by the conventional discontinuous process using a sheet of cloth.

An alternative embodiment of the device which has just been described is shown on FIG. 3. The modifications which have been made are designed to adapt the apparatus to the manufacture of a greater variety of cheeses.

One such improvement consists in providing the apparatus of FIG. 2 with means permitting the introduction into a hot column of moving water of a number of streams of cold concentrated milk which has been acidified with lactic ferments and treated with rennet for a suitable time. The progress of the curds in the column may be regulated by adjustable baffles, to promote hardening. At the base of the column is a succession of vertical or inclined tubes which may have different cross-sections and elbows, and which terminate over a device for cutting up the mass of curds which issues from the tubes. Finally, there is means for washing the cut-up curds, and for bringing together and agglomerating the grains of curd.

This improved apparatus preferably comprises a column provided with adjustable baffles, supplied by a nozzle for introducing liquid (which may be one of those shown in FIGS. 2, 3 and 6, although that of FIG. 6 is preferred, because it reduces turbulence to a minimum) and followed by a tube the inclination of which permits the reagglomeration and syneresis of the curds by compression due to differences in cross-sectional area, and the effects of gravity. The mass of curds obtained in this way is then cut along two substantially vertical planes, by means, for example, of vertical wires and a rotating cylinder having radial vanes, the speed of rotation of the cylinder being such as to make it possible to adjust the thickness of the cut. The sliced curd is then washed, either with pure water, or whey, which may or may not be heated, this whey having been driven from the syneresis of the curds, allowing for the dilution due to the introduction of hot water at the top of the apparatus.

Referring now to FIG. 3, it will be seen that the assembly comprises a filling head 29, a vertical column 30 is introduced, and in which it is treated with rennet and mixed with the hot water, the tubes 31 of varying cross-section which are fed from the column 30, the slicing means 32, and the washer 33.

The filling head 29 is provided with suction means 21 positioned near its upper end and two tubes 16a and 20a which are radially disposed and diametrically opposed. The tube 16a is connected to a pump and serves as an inlet for the cold, concentrated, rennet-treated milk. The tube 20a serves as an inlet for hot wtter. The tubes 16a and 20a carry thermometers 16a and 20b. The two fluid currents supplied through the tubes 16a and 20a are mixed in the vertical tube 34, which empties into the vertical tube 30.

This column 30 is square in section and is provided with baffles 35a, 35b, 35c, 35d which may be inclined at different angles by external control means. An intermediate member 36, at the bottom of the column 30, connects that column to a narrow cylindrical vertical tube 37, which is provided at its lower end with an elbow 37a which opens into a larger tube 38. The tube 38 is encircled by a jacket 39 through which a suitable fluid may be circulated. The tube 38 is inclined with respect to the horizontal and opens into a smaller tube 25, which comprises several bends, and terminates at 25a. The ends 25a of tne tube 25 is shown in greater detail on FIG. 4, and is provided with vertical wires 40 made of stainless steel. The assembly 31 comprises the tubes 37, 38 and 25.

The slicing means 32 comprises a tank 41 within which a hollow cylinder 42, made preferably of sheet steel, is rotatably mounted. The cylinder is provided with radial vanes 43 extending radially away from the cylinder, and its movement is controlled by a motor 44. The tank 41 comprises a receptacle 41a in which the whey is collected, which receptacle is drained by the tube 45. The tank is also provided with a funnel-shaped portion 41b, and a tube 46 opening into the tank immediately thereabove serves as an inlet for water or whey, which whey may be drawn from a tank 47 fed by the pipe 45. This whey is delivered to the tube 46 by the pump 48, followed by a heater 49. A tube 46b supplies water to the tube 46. Either of the tubes 46a and 46b may be used depending on the positions of the valves 40 and 51.

The lower part of the funnel 41b is connected to an elbow at the end of a tube 26 which is inclined slightly with respect to the horizontal, with its upper end opening over a mold 27. The tube 26 may be supplied with whey near its mid-point through a tube 46c, connected to the tube 46a and controlled by the valve 52.

When the concentrated milk, which has been inoculated with lactic ferments and exposed to rennet for about 30 minutes at a temperature of 8 to 10° C., is introduced into the filling head 29 through the tube 16a, it comes into contact with the stream of hot water injected through the tube 20a at a temperature of 48 to 53° C. The temperatures of the milk and hot water are measured by thermometers 16b and 20b. The fluid current carrying the curd grains in suspension then passes through the tube 34 and is injected into the top of the column 30. The tube 34 is kept constantly full of liquid by suction applied through the tube 21, which is connected to a vacuum pump.

The curd in the stream of fluid which enters the column 30 is compressed by impact against the constrictions formed by the vanes 35a, 35b, 35c and 35d. The average line of flow may be regulated by adjusting the inclination of the baffles.

Such an adjustment permits control of the hardness of the curd grains, the syneresis of which is accelerated by its impacts against the baffles, and the small size of the grains.

When such regulation is considered unnecessary, the column 30 may simply become gradually narrower as it approaches each of a series of axially spaced points and expand gradually beyond each point, thereby providing a series of fixed, axially spaced constrictions.

The fluid mixture containing the curd grains in suspension then enters the tube 37, which due to its smaller cross-section, causes an agglomeration of the curd grains. When the curd enters the tube 38 its mass is expanded due to the increase in the cross-section of the tube, and the curd will form itself into little blocks separated from each other by layers of whey mixed with hot water. In the tube 38 there is simultaneous syneresis of the curd grains and, due to the slope of the tube, a reagglomeration. If the jacket 39 is fed with hot water, the effect is to further compress the curd grains, that is to say, accelerate the syneresis.

The tube 25 at the end of the tube 38 is small in cross-section and contains a number of sharp turns or elbows so that the curds are further compressed, with further syneresis resulting. The curd which leaves through the orifice 25a is sliced along vertical planes by the wires 40. The sliced curd then comes in contact with the vanes 43 carried by the cylinder 42. These vanes, as the cylinder 42 rotates, cut the curd along planes substantially perpendicular to those along which it is cut by the wires 40. This double slicing of the curd may naturally be regulated by adjusting the speed of rotation of the cylinder 42, and produces a flow of whey which passes through the holes in the perforated sheet metal of which the cylinder 42 is made, and collects to the receptacle 41a.

The curd carried to the surface of the cylinder 42 between the vanes 43 falls into the funnel 41b. Regulation of the various parameters affecting this slicing operation makes it possible to obtain very different types of cheese structure.

The curd recovered in the funnel 41b enters the tube 26, through which it passes before falling into the mold 27. As it passes through the tube 26, the curd grains are washed by a liquid introduced through the tube 46 above the funnel 41b. This liquid may be water, at an adjustable temperature, which is admitted through the tube 46b, but may also be whey recovered from the receptacle 41a through the circuits 45, 47, 48, 49, 46a. This whey may or may not be heated, depending on whether the heater is placed in operation, and this heating is one parameter used to control certain cheese making processes.

The addition of heat at the moment of washing results in a compression of the grains and a maximum extraction of whey, so that a drier cheese is formed. In order to increase the efficacity of the washing carried out in the tube 26, the valve 52 may be opened so as to provide a second injection of whey or water through the tube 46c.

Depending upon whether or not the curd is washed in the assembly 33, a cheese is obtained which cures more or less rapidly. In effect, a very thorough washing removes a large part of the lactose in the paste, which permits the cheese to cure rapidly, whereas a less thorough washing, or practically none at all, yields a cheese which cures more slowly. In the first case a cheese of the Saint-Paulin type is obtained, in the second a cheese of the Cheddar or Gruyere type.

In the process illustrated in FIGS. 5 and 6, the milk employed as a raw material is initially concentrated to approximately one-third or one-quarter of its original volume. To ensure the degree of acidification desired, lactic leavenings are added in a proportion close to 10% in relation to the volume of concentrated milk, and the milk thus seeded is then allowed to "ripen" at a temperature of approximately 20° C., until a pH value of between 4.8 and 5.1 is obtained, the ripening period required amounting to approximately 10 to 12 hours. Acidification may be effected by means of organic or inorganic acids, in countries in which this is lawful.

The concentrated milk thus ripened is then introduced into the device illustrated in FIG. 6. In this device, the concentrated milk ripened at ambient temperature is brought into contact with hot water, in the approximate proportions of one volume of hot water to one volume of concentrated milk, thereby heating the milk in such manner that the mixture of milk and water has a temperature of approximately 45 to 50° C., corresponding to a temperature of approximately 60 to 75° C. of the hot water. This injection of the ripened concentrated milk into the hot water is preferably performed at right angles to the flow of hot water.

In certain cases, the curds issuing from the machine after draining may have an overall dry extract content greater than one may wish. Whey drained off may then be reincorporated in the curds obtained, and it is one of the features of the product obtained by means of the process according to the invention, that this reincorporation may be performed in very convenient manner, and this the more easily the more the temperature of the curds obtained or of the whey reincorporated has been lowered. The production of the fresh cheese paste ends by stirring followed by a "smoothing" action between two rolling cylinders or by compression behind a so-called homogenizing valve.

The fresh cheese paste obtained according to this last-mentioned process does not contain rennet and contains a substantial quantity of calcium.

It should be noted that the fresh cheese paste obtained by this process differs very greatly and advantageously from the fresh cheeses made at present by the known processes.

The process according to the invention thus considerably limits the losses of fatty substances in the whey drained off, which renders it possible to produce fresh cheeses containing a high proportion of fatty substances in a single operation.

It is found moreover that the process according to the invention renders it possible to retain a high proportion of calcium in the curds, whereas in the processes known to this day, the calcium is almost wholly lost in the whey drained off, in the form of calcium lactate. On the contrary, in the product according to the invention, the calcium is probably retained in the form of calcium phosphocaseinate, and the product obtained corresponds to a calcium/phosphorous ratio close to that existing in the original milk, and which according to recent dietetic research, substantially corresponds to an optimum of assimilation of calcium by the human organism.

On the other hand, the presence of calcium in the product according to the invention is of considerable importance since it prevents the pH value of the concentrated milk from dropping, in the course of production, to a level inhibiting the lactic ferments. The result thereof is that the lactic ferments remain active in the paste obtained, and the lactic flora may thus proliferate in such manner as to facilitate digestion of the product by the human organism.

It is emphasized moreover that the taste of the product according to the invention is considered to be distinctly superior to that of the previously known products, given that the organic compounds determining the taste of the fresh cheese are present in the paste in considerably greater quantity that that obtained previously.

Finally, the absence of rennet from the paste has the result that the evolution of the same in storage is very slow, even at a temperature close to 25° C., and that no syneresis occurs after the conditioning of the fresh cheese.

If allowance is made moreover for the fact that, in the process according to the invention, the lactose which is not converted into lactic acid is retained in such greater proportion than in the processes known to this day, it will easily be appreciated that the efficiency of the process according to the invention is considerably greater than that of the proceses known in the prior art. This advantage is additional to that of simplicity, the process according to the invention being free of any manual intervention, and being performed in the course of a period of the order of 10 minutes following the ripening stage of the seeded concentrated milk.

Example 1

Milk containing 82 grams of non-fatty solids and 42 grams of fatty solids per liter is standardized by partial separation so as to lower the percentage of fatty solids to 38 grams per liter. This milk is then pasteurized according to the H.T.S.T. method at a temperature of 75° C., and concentrated in a double-effect evaporator of the film type, working under a partial vacuum at a temperature of 65° C. in the first stage. This yields concentrated milk containing 360 grams of solids per liter. This concentrated milk leaves the evaporator at 42° C. It is cooled to 8° C. by means of a heat exchanger, and then stored in a reservoir at this temperature for six hours. A 2% dose of lactic ferments, of the Streptococcus lactis type, is added to protect the mixture. At the end of the six hours the concentrated milk is reheated to about 30° C. by circulating it through a heat exchanger. A supplemental dose of ferments (about 6%) is then added. When the pH of the concentrated milk reaches a value of 5.95, it is rapidly cooled to about 8° C. by circulating it through a heat exchanger.

The concentrated cold, acidified milk is then introduced into a machine of the type shown on FIG. 1. 10 cm.$^3$ of a $\frac{1}{10,000}$ concentration of rennet, is now introduced into the tanks 4 by means of an automatic dosing device 10a. This is followed by 12.8 liters of concentrated milk prepared as described above and introduced by the dosing device 10b.

After the rennet has been in contact with the concentrated milk for 7 minutes at 8° C., the tanks arrive at the gantry 11, at which point hot water is added. This water is at 50° C., and is introduced into each tank in a quantity such that the percentage of solids in the mixture of concentrated milk and water is reduced to 130 grams per liter. (In other words, about 22.7 liters of water are added.) Coagulation takes place under tranquil conditions after about 60 seconds. After about 5 minutes, the tanks containing the curdled milk reach the gantry 12 carrying the cutting grilles. The curd is then cut up into cubes. Sixteen to seventeen minutes after this operation the tanks reach the distributor 14, tilt, and the mixture of curds and whey is emptied into the distributor, and thence into the final molds. This process yields cheese of the Carré de l'Est type.

Example 2

Normal milk is standardized and pastuerized as in Example 1. This milk is then concentrated until it contains 450 grams per liter of solid materials. The concentrated milk leaves the evaporator at 42° C. and is cooled to 10° C. in a heat exchanger. The concentrated milk is acidified by adding lactic ferments of the *Streptococcus lactis* type until it attains a pH of 5.95 immediately after the inoculation. The percentage of solids is thus brought to about 30%. The cheese is then made in the same way as in Example 1, by adjusting the quantity and temperature of the hot water so as to obtain a mixture of concentrated milk and water comprising 130 grams of solids per liter and a temperature of about 35° C. The resulting cheese is of the Carré de l'Est type.

Example 3

Normal milk containing 82 grams per liter of solid non-fats and 42 grams of fatty solids per liter is standardized by partial separation so as to reduce the fatty solid content to 36 grams per liter. The milk is then concentrated in the same way as in Example 1, and acidified by adding 1% of lactic ferments. When the pH of the inoculated milk reaches about 6.15, the cold, acidified milk is introduced into a vat, within which it is treated with 1% of rennet at a concentration of $\frac{1}{10,000}$, that is to say, about 100 cm.$^3$ per 100 liters of concentrated milk containing 36% solids. After the rennet has been in contact with the milk for thirty minutes, the cold, rennet-containing milk is introduced into the apparatus shown in FIG. 2 where it coagulates instantly when it comes in contact with hot water at 40° C., introduced into the vertical tube 18 through the tube 20. The proportions of concentrated milk and hot water are so adjusted as to bring the temperature of the mixture to about 31° C., which requires that the volume of flow of the hot water be about 2.2 times greater than that of the concentrated milk.

The resulting curdled milk is then washed and agglomerated and leaves the apparatus ready for molding. This process yields cheese of the "Saint-Paulin" type.

Example 4

Normal milk comprising 82 grams per liter of non-fat solids and 42 grams per liter of fatty solids is pasteurized at 73° C. for 30 seconds by the H.T.S.T. process and then concentrated as described in Example 1. The concentrated milk is then acidified by adding 2% of lactic ferments, at a temperature of 12° C. When the pH of the concentrated milk reaches about 5.5, the product is cooled to 8° C. to prevent further change in the pH value. In those jurisdictions where it is permitted by law, the milk may be acidified by adding lactic acid.

The concentrated, cold and acidified milk is then introduced into a vat where it is treated with 1% rennet at a concentration of $\frac{1}{10,000}$, that is to say, about 100 cm.$^3$ per 100 liters of concentrated milk comprising 36% solids. After 30 minutes of contact between the milk and the rennet, the concentrated, acidified, rennet-treated milk is introduced into the device shown on FIG. 3, where it coagulates instantaneously when it comes into contact with hot water at 48° C., which enters the vertical tube 34 through the tube 20a.

The relative volumes of flow of the concentrated milk and hot water are so adjusted as to bring the temperature of the mixture to about 36° C., which requires that the flow of hot water be about 1.6 times as great as that of the concentrated milk.

The curd then agglomerates in the column 30 and the tube 31, and exudes whey. The curd and the whey are separated in the chamber 41. The whey is circulated by the pump 48 to be reheated in the heat exchanger 49 to about 45° C., and is then reintroduced into the curd through the tube 46, so as to help carry the curd toward the outlet and cause "Cheddarization" of the grain.

After pressing, salting and curing, this process yields cheese of the Cheddar type.

It will be clear that the same result may be obtained by removing the curd directly from the outlet of the chamber 41 of the machine shown in FIG. 3, and transferring it to conventional Cheddarization apparatus.

Example 5 (FIGS. 5 and 6)

The milk employed as the raw material is poured into the funnel 61 of the evaporator 62. This milk contains approximately 120 grams of dry solids per 1,000 cc., approximately 35 grams of which are fatty solids. The concentration is carried on down to a third of the original volume, so that about 3,300 cc. of concentrated milk is obtained from 10,000 cc. of natural milk. This concentrated milk is drained from the evaporator 62 through the pipe 63 to a dosing unit 64. The dosing unit 64 mixes the said concentrated milk with 10% by volume of lactic leavenings of the *Streptococcus lactis* type and of the *Streptococcus cremoris* type, fed into the apparatus through the funnel 65. The mixture thus formed is stored at 20° C. in a vat 66, for 12 hours. The pH value obtained at the end of this ripening period amounts to 4.9.

The milk is then drawn off from the vat 66 and led to an injection head 67.

The injection head 67 is of substantially cylindrical shape. It comprises an axial pipe 68 through which the ripened concentrated milk is injected. The pipe 68 is surrounded by a protective jacket 69 supplied with water at a temperature of approximately 15° C. through the pipe 71, this water being drained through the pipe 70. The injection pipe 68 is pierced at its lower extremity by vertical slots 72 distributed along its entire lateral surface. A piston 73 situated below these slots and within the pipe 68 renders it possible to cover the slots 72 partially, so that the speed of discharge of the jets of ripened concentrated milk injected may be controlled as a function of the rate of flow.

The injection head 67 also comprises at one side a hot water inlet 74. The hot water fed in through the pipe 74 impinges on a plate 75 which is provided with a hole 76 diametrically opposite the inlet 74. Several circular rings 77 made of fine wire mesh are positioned between the plate 75 and the upper part of the slots 72.

The ripened concentrated milk at 20° C. is fed into the injection head 67 through the pipe 68 at a rate of flow of approximately 44 gallons/hour, and the said injection head 67 is supplied at the same time with an equal flow of hot water at 70° C. The temperature of the concentrated milk is maintained substantially at 20° C. by means of the cold water jacket 69. The hot water is first injected into the injection head 67 in turbulent condition, but this water reaches the level of the slots 72 in substantially laminar flow conditions, by virtue of the plate 75 equipped with its hole 76 and of the different screens 77, below which the pipe 68 is kept substantially full of water.

At this level, the longitudinal flow of hot water meets the concentrated milk discharged radially through the slots 72. The position of the piston 73 within the tube 68 is adjusted so that the speed of discharge of the concentrated milk is sufficient to cause mixing of the milk with the hot water as a whole, but insufficient for the concentrated milk to reach the lateral sides of the injection head 77. The ripened concentrated milk thus injected curdles immediately on coming into contact with the hot water, and the curds thus obtained are discharged into a tube 78 having a diameter of approximately 4 inches, this tube being U-shaped and its two vertical limb portions having a height of approximately 59 inches. The tube 78 opens into a rotary screen formed by a draining drum 79 which revolves at approximately 20 revolutions per minute. The length of this drum is sufficient to ensure that the curds are drained sufficiently on issuing from the drum, that is to say so that it issues as a paste having a solids content of approximately 30%. With the rates of flow and dimensions hereinbefore specified, the draining action is completed approximately 4 minutes after the instant of formation of the curds in the injection head 67. The whey drained off flows out through the pipe 79a.

A pipe 80 conveys the curds to a stirring mechanism 81. If the curds obtained have an excessive overall solids content, this device renders it possible to reincorporate a certain quantity of the whey which has been drained off, or of acidified concentrated milk, which may have been flavored or not, into the paste, the reincorporation of concentrated milk rendering it possible to benefit from an appreciable increase in output. This device comprises cooling elements by means of which the temperature of the curds obtained may be reduced to 20° C. or even less, in such manner as to facilitate reincorporation into the curds of the whey drained off. After stirring, the paste is injected into a "smoothing" or homogenizing machine 82, and the fresh cheese is finally conditioned in the containers 83.

The quantity of whey drawn off through the pipe 79a is considerably smaller than that drawn off in the processes heretofore known, when allowance is made for the fact that for 10,000 cc. of natural milk employed as the raw material, one obtains 3,300 cc. of concentrated milk, and consequently 6,600 cc. of mixture after injection of the hot water.

The injection head 67 may of course be used in the manufacture of cheeses according to processes utilizing rennet, as well as the process which has just been described in order to illustrate the utility of the apparatus of FIGS. 5 and 6.

What is claimed is:

1. A process for making cheese from milk which comprises the steps of:

heat-evaporating normal whole milk to a solids concentration from 2 to 4 times that prevailing in the original milk;

inoculating said evaporated milk with a lactic ferment and permitting it to ripen to pH suitable for coagulation into cheese-making curds while maintaining the temperature of said milk sufficiently low during a sufficient portion of the time utilized for ripening to prevent coagulation of said milk;

adding a coagulant to said ripened milk while likewise maintaining said milk too cold to coagulate;

coagulating the resulting mixture consisting essentially of lactic ferment, coagulant, and the product resulting from the evaporation of normal milk by heating it to a temperature between 30° and 40° C., by mixing it with hot water begining several minutes after the addition of coagulant;

removing the whey; and forming the remainder into cheese.

2. The process claimed in claim 1 in which said milk is acidified to a pH between 4.6 and 6.5 by temporarily warming it and adding additional lactic starter toward the end of said ripening step but before said coagulant is added.

3. The process claimed in claim 1 in which said mixture is continuously advanced along a predetermined path from the time said hot water is added until the resulting curd is ready for molding.

4. The process claimed in claim 3 according to which said mixture is introduced into a container which is successively advanced from a station at which said milk with lactic ferment is introduced into said container, through a station at which said coagulant is introduced into said container, through a station at which said hot water is added to said container, to a station at which the resulting curds are cut into discrete masses.

5. The process claimed in claim 1 in which immediately after said mixture is mixed with hot water, it is introduced into a passageway provided with successive constrictions through which it is advanced until syneresis is substantially complete, and the resulting curds and whey are then separated.

6. The process claimed in claim 5 in which the mixing of said mixture with hot water, the advancement of said mixture through said constricted passageway, and the separation of the curds from the whey are carried out successively in a continuous process.

7. The process claimed in claim 6 in which said separated curds are then continuously washed as they are advanced through a second passageway.

8. The process claimed in claim 7 in which said separated curds are heated while being washed.

9. The process claimed in claim 1 in which said coagulant is rennet.

10. The process claimed in claim 9 in which said rennet treated milk is kept at a temperature too low to coagulate for at least one hour.

11. The process claimed in claim 1 in which said milk is concentrated in a film evaporator.

12. The process claimed in claim 1 in which said resulting mixture is injected into a descending column of hot water.

13. The process claimed in claim 12 in which said mixture is injected transversely into said column of hot water.

14. The process claimed in claim 13 in which said mixture is injected with a force too small to reach the walls sustaining said column of water.

15. The method of producing a paste from which cheese can be made by conventional procedures, which method comprises the step of:

heat-evaporating normal whole milk to a solids concentration from 2 to 4 times that prevailing in the original milk;

inoculating said evaporated milk with a lactic ferment and permitting it to ripen to pH suitable for coagulation into cheese-making curds while maintaining the temperature of said milk sufficiently low during a sufficient portion of the time utilized for ripening to prevent coagulation of said milk;

adding a coagulant to said ripened milk while likewise maintaining said milk too cold to coagulate;

coagulating the resulting mixture consisting essentially of lactic ferment, coagulant, and the product resulting from the evaporation of normal milk by heating it to a temperature between 30° and 40° C., by mixing it with hot water beginning several minutes after the addition of coagulant; and removing the whey.

16. The process claimed in claim 15 in which said mixture is coagulated by injecting it into a moving column of hot water to produce curd in the form of small grains which facilitate syneresis.

17. The process claimed in claim 16 in which said syneresis is carried out by advancing the curd, while suspended in said column of water, through a pipe provided with longitudinally spaced constrictions.

References Cited
UNITED STATES PATENTS

| | | | |
|---|---|---|---|
| 1,711,032 | 4/1929 | Richardson | 99—116 |
| 2,997,395 | 8/1961 | Berridge | 99—116 |
| 3,120,443 | 2/1964 | Berridge | 99—116 |
| 3,298,836 | 1/1967 | Emstrom | 99—116 |

LIONEL M. SHAPIRO, Primary Examiner

D. M. NAFF, Assistant Examiner

U.S. Cl. X.R.

99—20